United States Patent [19]

Arenson

[11] 4,025,656
[45] * May 24, 1977

[54] PREVENTING FOOD PRODUCTS FROM ADHERING

[75] Inventor: Simon Weil Arenson, Baltimore, Md.

[73] Assignee: Food Research-Marketers, Inc., Baltimore, Md.

[ * ] Notice: The portion of the term of this patent subsequent to Apr. 29, 1992, has been disclaimed.

[22] Filed: Feb. 23, 1976

[21] Appl. No.: 660,533

Related U.S. Application Data

[63] Continuation of Ser. No. 572,509, April 28, 1975, Pat. No. 3,940,497, which is a continuation-in-part of Ser. No. 358,315, May 8, 1973, Pat. No. 3,881,029, which is a continuation-in-part of Ser. No. 299,920, Oct. 24, 1972, abandoned.

[52] U.S. Cl. .............................................. 426/92
[51] Int. Cl.² .......................................... A23B 4/00

[58] Field of Search ............... 426/92, 89, 274, 289

[56] References Cited

UNITED STATES PATENTS

| | | | |
|---|---|---|---|
| 1,996,392 | 4/1935 | Torrence et al. | 426/398 X |
| 2,819,975 | 1/1958 | Letney | 426/307 |
| 2,927,029 | 3/1960 | Long | 426/121 |
| 3,177,081 | 4/1965 | Kleinschmidt et al. | 426/289 |
| 3,453,120 | 7/1969 | Olson et al. | 426/92 |
| 3,881,029 | 4/1975 | Arenson | 426/274 |
| 3,940,497 | 2/1976 | Arenson | 426/274 |

*Primary Examiner*—Joseph M. Golian
*Attorney, Agent, or Firm*—Pollock, Vande Sande, & Priddy

[57] ABSTRACT

A method of preventing the adherence of food products by applying a fat material in powder form to at least one surface of the food products, and the coated food products.

15 Claims, 3 Drawing Figures

U.S. Patent
May 24, 1977
4,025,656
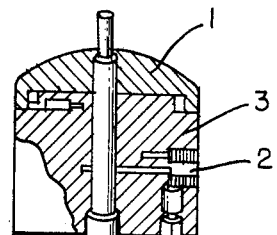
FIG. 1.
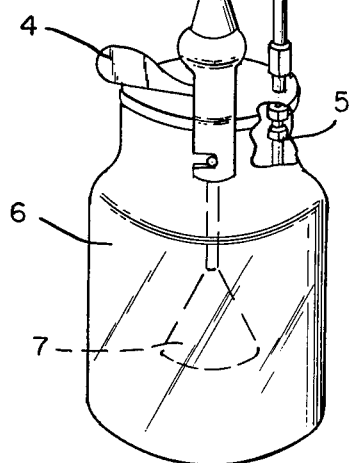
FIG. 2.
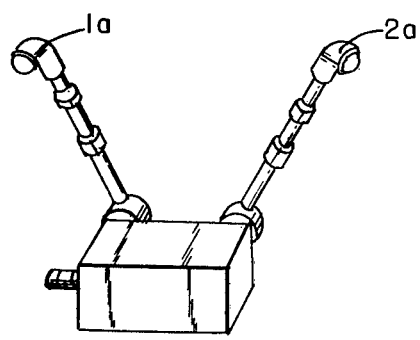
FIG. 3.
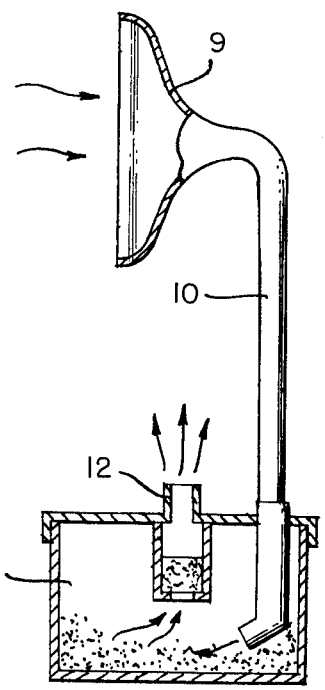

4,025,656

PREVENTING FOOD PRODUCTS FROM ADHERING

CROSS REFERENCES TO RELATED APPLICATIONS

This is a continuing application of Ser. No. 572,509 filed Apr. 28, 1975, now U.S. Pat. No. 3,940,497 which in turn is a continuation-in-part of Ser. No. 358,315 filed May 8, 1973, now U.S. Pat. No. 3,881,029, which in turn is a continuation-in-part of my application Ser. No. 299,920 filed Oct. 24, 1972, and now abandoned.

BACKGROUND OF THE INVENTION

The present invention is directed to preventing food products in contact with one another from adhering. The present invention is particularly concerned with preventing food products such as uncooked meats including bacon, hamburger patties, pork patties, steaks, and mutton; uncooked poultry including chicken, turkey, and duck; and uncooked seafood including fish (i.e., cod fish and halibut) from adhering.

Various food products are available both in refrigerated and frozen sections in groceries. However, many food products, when packaged in contact with each other without any barrier between them, tend to adhere. It is believed that during contact of one portion of a food product with another portion, such as a slice of bacon with another slice of bacon, the soft oils in the food product blend at contact points forming loose bonds. The oils congeal during refrigeration or freezing and resist forces applied in separating the food portions. Adherence between oils in the different food portions in many instances results in tearing of the food product when separated.

Accordingly, it is an object of the present invention to prevent food products in general from adhering, and lose at most a minimum amount of water.

Another object of the present invention is to provide food products that when frozen do not adhere together and do not support mold growth.

One particular food product wherein adherence is a particularly acute problem is bacon. It has been noted that sales of packaged sliced bacon have increased during the last two decades only in proportion to the population growth. Sales growth for slices packaged bacon does not compare favorably with the sales growth of foods as meats, fish, and bakery products. Bacon sliced and in packages is available only in the refrigerated section and not in the frozen section. Some bacon slices are packaged stacked one slice against another slice under atmospheric conditions. Other bacon slices are packaged stacked one slice against another slice in an atmosphere of nitrogen. Both the nitrogen packed bacon and the atmospherically packaged bacon are sold refrigerated and are maintained refrigerated in households. Packaged bacon does not separate easily one slice from another slice and has limited quality shelf life.

The quantity of fat in bacon as well as the composition of the fat and its characteristics are major factors in the adherence of bacon slices. The quantity of fat is shown in Chart No. 1 below.

|  | Water | Protein | Fat |
|---|---|---|---|
| Sliced bacon | 19.3% | 8.4% | 69.3% |

Values from Handbook No. 8 U.S.D.A. Page 8, Item 125.

The diet of hogs has a pronounced influence on the fatty acid composition of the fat. The softening point and the melting point of the bacon fat vary with its percentage of saturated and unsaturated fatty acids. The bacon fat is more firm when the percentage of saturated fatty acids predominate and are less firm when the saturated acids are low and the unsaturated acids predominate. Chart No. 2 below shows the effect of diet on fat of hogs and particularly the composition and characteristics of composite body fat of hogs raised on different feeds.

| Feed | Brewer's rice with tankage | Corn with tankage | Peanuts (grazed) | Soybeans (grazed) |
|---|---|---|---|---|
| Oil content of feed % | 0.8 | 4.3 | 33.1 | 17.5 |
| Iodine number of oil | 100.0 | 126.0 | 93.0 | 128.0 |
| Analysis of fat: | | | | |
| Iodine number | 54.7 | 60.8 | 89.6 | 93.2 |
| Refractive index at 40° C | 1.4585 | 1.490 | 1.4625 | 1.4630 |
| Melting point, 0° | 37.3 | 39.1 | 19.4 | 26.0 |
| Titer, 0° | 40.0 | 40.3 | 28.1 | 33.9 |
| Saturated acids % | 39.3 | 39.3 | 20.6 | 27.2 |
| Oleic acid % | 58.7 | 52.1 | 58.0 | 40.8 |
| Linoleic acid % | 2.0 | 8.6 | 21.4 | 32.0 |

N. R. Ellis and H. S. Isbell, J. Biol. Chem. 69-219-248 (1926)

Variations in age of the animal has an influence on the fat characteristics. Chart No. 3 shows the influence of age on hogs raised on skim milk and corn.

| Approximate age of animals | Approximate weight of animals (lb.) | Fat Titer (° C) | I. No. of fat | Composition of Fatty Acids % | | |
|---|---|---|---|---|---|---|
| | | | | Satd. | Oleic | Linoleic |
| 6 weeks | — | 37.0 | 72.5 | 33.2 | 54.5 | 12.3 |
| 10–12 weeks | — | 37.5 | 71.0 | 31.4 | 54.8 | 13.8 |
| 5 months | 70 | 37.8 | 66.1 | 36.9 | 51.4 | 11.7 |
| 6 months | 100 | 37.9 | 63.2 | 37.3 | 53.9 | 8.8 |
| 7 months | 170 | 39.2 | 59.7 | 38.4 | 54.3 | 7.3 |
| 8 months | 225 | 39.1 | 58.8 | 38.6 | 54.4 | 7.3 |

N. R. Ellis and O. G. Hankins, J. Biol. Chem. 66-101-122 (1925)

Variations in the fat make it difficult to prepare bacon slices made with the fat as a component part that will not adhere and will be flavorful.

Accordingly, another object of the present invention is to provide a method to prevent bacon slices from adhering during refrigeration or freezing when they are stacked one against the other without any non food barrier between them.

Another object of the present invention is to provide bacon slices that when frozen do not adhere together.

Another object of the present invention is to provide bacon slices that when frozen do not adhere together and do not support mold growth.

Another object of the present invention is to provide bacon slices that when frozen or refrigerated do not adhere together by employing a method that is economical to utilize and efficient to carry out.

This and other objects of this invention will become apparent from a reading of the following specification and claims.

SUMMARY OF THE INVENTION

The present invention is directed to a method of preventing the adherence during freezing or during refrigeration of food products in contact with one another which comprises applying a coating of hardened oil or fat in powder form in an amount effective to prevent adherence during freezing or refrigeration to at least one contacting surface of the food product. In addition, the process of the present invention makes it possible to provide food products which remain fresh during their expected shelf life. The present invention is also directed to food products obtained by the above-described process.

Moreover, the present invention is directed to a food product coated with a hardened fat in powder form in an amount sufficient to prevent adherence of the product to another during freezing or refrigeration in contact with another food product so coated.

BRIEF DESCRIPTION OF DRAWINGS

FIGS. 1, 2, and 3 illustrate equipment suitable for carrying out the process of the present invention.

DESCRIPTION OF PREFERRED EMBODIMENTS

The food products which can be treated according to the present invention include meats including bacon, hamburger patties, pork patties, steaks and mutton; poultry including chicken, turkey, and duck; and seafood including fish. The present invention is particularly advantageous for treating bacon slices and pork patties. The ability to obtain bacon slices which do not adhere when frozen is especially advantageous.

The fat material employed according to my invention must be in powder form and can be obtained from any source. While I prefer in the practice of my invention when treating bacon slices or pork patties to apply powder made from hog fat which is the same fat that is in bacon, I can use food grade powders made from other animal fats. I can use oils or fats obtained from vegetables, marine, mineral, or synthetic sources. I can also use fats from milk, cream, or butter.

To prepare food products and particularly bacon slices that can be frozen stacked one slice against another slice without adhering I preferably apply a powdered lard fat to one or to both sides of the bacon slice or other food product. The powder is made from hardened fat from lard.

The fats in powder form employed in accordance with the present invention generally have iodine values of from 0 to about 10, Wiley melting points of from about 110° to about 175° F, free fatty acid values of about 0.5% maximum. The fats should remain in powder form at temperatures at least below about 95° F.

To obtain substantially uniform coating over substantially the entire surface of the food product usually powders having a particle size small enough so that 100% will pass through a U.S. No. 30 sieve at 10° F are employed. Preferably at least about 75% of the particles employed will pass through a U.S. No. 70 sieve at 10° F. The minimum particle size of the powders is not particularly crucial and is primarily dependent upon production and economical considerations.

A particularly useful powdered lard fat suitable for the present invention has particle size whereby at least about 75% of the powder will pass through a U.S. No. 200 mesh sieve at 70° F. Also, the powdered lard fat has a melting point of about 110° to about 120° F, an iodine value of about 10 maximum, and free fatty acid value of about 0.5% maximum.

Another particularly useful powdered fat suitable for the present invention is hardened vegetable oil described in my U.S. application Ser. No. 299,920 filed Oct. 24, 1972 disclosure of which is incorporated herein by reference. Such hardened vegetable oil can be in powder form and is preferably a hydrogenated deodorized vegetable oil having a Wiley melt point of about 140°–150° F, and an iodine value of about 5 maximum. Such fat material can be obtained by hydrogenation similar to that employed in preparing shortenings for use in baking, frying and other food operations, with the exception that the hydrogenations continued until the iodine value has reached approximately 5 units.

The amount of powder that adheres to the food product is a function of the temperature of the food product at the time the powdered fat is applied and the surface area of the food product that is being coated. The powder pick up increases as the temperature of the food product increases and as the surface area of the food product increases. Usually amounts of powder from about 0.07% by weight to about 0.3% by weight and preferably from about 0.1% to about 0.2% by weight based upon the weight of the food product are employed. The amount employed can vary so long as it is sufficient to prevent adherence during freezing or refrigeration of the food product. Also, the maximum quantity of powdered fat is primarily determined by economical and practical considerations.

The temperature of the food product during coating should be lower than that temperature which would cause melting of the powdered fat which in turn would cause excessive absorption of the powder into the food product thereby defeating the purposes of the present invention.

For commercial processes for preparing bacon slices, after the bacon is sliced, which is at a temperature of about 45° F or less, it is most convenient to coat the bacon slices directly without increasing the temperature of the bacon by applying the powdered hardened fat particles. For treating food products according to the present invention including the bacon slices, fish, hamburger, and pork patties, it has been found preferable to maintain the food product at temperatures of about 38° F or less during the coating operation. It is noted that in the present process that the powder exists in only one physical state (i.e., solid) throughout the entire coating process.

Chart No. 4 shows the influence of powdered vegetable fat applied to breaded fish portions that are stacked one atop another without any barrier between each portion during freezing storage conditions.

Chart 4

|  | Breaded Fish Portions Coated with Powdered Vegetable Fat | Breaded Fish Portions Separated with Paper No Coating |
| --- | --- | --- |
| Storage temperature ° F | −10° F | −10° F |
| Storage time 15 days | Perfect Release | Could not be separated by hand action alone, but required excess force such as striking the fish on a hard surface (e.g., table) for separation. |
| Storage time 30 days | Perfect Release | Could not be separated by hand action alone, but required excess force such as striking the fish on a hard surface (e.g., table) for separation |

Test procedure: 48¾ oz. cod fish blocks were breaded. 24 were coated with 0.25% powdered vegetable fat. 24 were not coated and were separated with paper. A 10 pound weight was placed on each stack. One stack of 24 was composed of the blocks coated with the powder. One stack was composed of uncoated blocks that were seperated with paper.

The powdered vegetable fat was applied to the fish at −10° F employing apparatus and process similar to that particularly shown in FIGS. 1–4 in my U.S. Pat. No. 3,881,029.

Chart No. 5 below demonstrates the influence of powdered vegetable fat applied to unbreaded fish units such as in stick, portion, block or filet form that are stacked one atop another without any barrier between each portion during freezing storage conditions.

Chart 5

|  | Unbreaded Fish Portions Coated with Powdered Vegetable Fat | Unbreaded Fish Portions Coated with Powdered Vegetable Fat |
|---|---|---|
| Storage temperature ° F | −10° F | −10° F |
| Storage time 15 days | Perfect Release | Could not be separated by hand action alone, but required excess force such as striking the fish on a hard surface for separation. |
| Storage time 30 days | Perfect Release | Could not be separated by hand action alone, but required excess force such as striking the fish on a hard surface for separation. |

Test procedure: 24 unbreaded fish blocks were coated with 0.25% powdered vegetable fat. 24 were not coated and were separated with paper. A 10 pound weight was placed on each stack. One stack of 24 was composed of the blocks coated with the powder. One stack was composed of uncoated blocks that were separated with paper.

The powered vegetable fat was applied to the fish at −10° F employing apparatus and process similar to that particularly shown in FIGS. 1–4 in my U.S. Pat. No. 3,881,029.

Charts 6 and 7 show the influence of the powder on their adherence during freezing and on the flavor quality. Chart 6 shows the influence of powdered fat applied to bacon slices on adherence during freezing storage.

Chart 6

|  | Adherence Status * Coated Slices | Uncoated Slices |
|---|---|---|
| After 96 hours | Perfect Release | Adhered |
| After 1 month | Perfect Release | Adhered |
| After 2 months | Perfect Release | Adhered |
| After 3 months | Perfect Release | Adhered |
| After 6 months | Perfect Release | Adhered |

Legend:
* Freezing time at 0° F
One pound packages of bacon slices were used.

Pound packages of bacon slices were coated with about 0.2% by weight of hardened lard fat in powder form and stacked with no barrier except the powder between each slice. Each stack was placed in a plastic nonrigid bag like those commonly used in households to contain sandwiches. Each stack was frozen at 0° F. At the time intervals indicated in the table, a stack was removed from the freezer and the slices were tested for ease of release. Uncoated bacon slices packaged the same way were used as a control.

Chart No. 7 shows the influence of freezing on flavor of the coated bacon slices.

Chart 7

| Freezing time | Flavor |
|---|---|
| 96 hours | Original flavor retained |
| 1 month | Original flavor retained |
| 2 months | Original flavor retained |
| 3 months | Original flavor retained |
| 4 months | Original flavor retained |
| 6 months | Original flavor retained |

In the test one (1) pound packages were frozen to 0° F. In the test one-half of the bacon slices were broiled and the other half were fried. The flavor value of the uncoated slices decreases as the storage time increases.

The food products after application of the powdered fat are dry to the touch. It is believed that the food products are dry to the touch because the powdered fat enters the surface oil cells and congeals the loose oil in them.

Since there is no loose oil remaining on the surface of the food products, when handled there is less chance of mold spores being deposited from hands of the handlers. Also, any airborne mold spores and bacteria in the ice box will contact a nonfavorable media, and will not multiply to any great extent.

Oxidative rancidity is reduced by use of the coating of powdered fat, since the food product surface presented to oxygen are dry and are not susceptible to reactions with oxygen.

I can apply the powder by any powder coating process, and preferably to uniformly coat substantially the entire contacting surface of the food product, and to prevent excessive space between the powder particles of the powder since such space could defeat the purposes of this invention of the prevention of adherence during freezing or refrigeration. For instance, I can apply the powder first to one side by passing it on a belt through a curtain of the powder falling in a known amount then passing it under an exhaust arm that removes any excess powder that has not adhered. The food product would then be turned onto a second belt and the process repeated. This is the powder coating process I disclosed in U.S. patent application Ser. No. 358,315 filed May 8, 1973 disclosure, now U.S. Pat. No. 3,881,029 of which is incorporated herein by reference.

When treating bacon slices, I prefer to apply the powder by spraying the powder using a process that applies the powder in a known and uniform amount and in which the powder not adhered like the amount in excess of that which uniformly coat substantially the entire surface of the slice is retrieved and reused.

The process of applying the powder by spraying it on to one side of the bacon slice and then on to the other side of the slice is carried out by using assembly FIG. No. 1 to hold and convey the powder, nozzles FIG. No. 2 to apply the powder and exhaust unit FIG. No. 3 to trap the powder that does not adhere for reuse.

The process of applying the powder by spraying entails use of powder holding tank 6 which holds the quantity of powder that is required for a unit operation time. Self locking lid 4 keeps out foreign atmosphere. Compressed air forces the powder up through the pipe assembly 7. Ratchet 1, a ring cap, allows metering of the powder in known amounts by adjusting needle valve 2 in the pipe assembly. Check valve 5 prevents back pressure from clogging the carburetor 3 and powder lines. Carburetor body structure assures long lasting uniform action 3.

Pipe assembly 7 is connected with the spray system with tubing (not shown) FIG. No. 2. The spray head system is completely flexible on all axes and the spray pattern is adjustable so the powder covers the slice area. Manifold extensions have positive locking devices to prevent accidental movement of heads 1*a* and 2*a*. Each manifold swings in 90° arc and each spray nozzle head 1*a* and 2*a* swivels in a 360° arc and 15° forward and backward. When desired, more than two spray heads can be utilized.

Exhaust unit FIG. No. 3 takes in powder not adhered. It is made up of receiving arm 9 conveying tube 10 and receiving tank 11.

In the process the powder in tank 6 is forced by air pressure through pipe assembly 7 into the spray nozzles 1*a* and 2*a* through the manifold to which they are attached. Spray nozzles are positioned so that nozzle 1*a* applies the powder to one side of the bacon slice, while substantially simultaneously nozzle 2*a* applies the powder to the bacon slice other side. The powder that does not adhere passes into exhaust arm 9 to tube 10 and into tank 11. Exhaust air moves out through 12.

Also, when desired, the above-defined apparatus can be maintained at reduced temperatures to assure that the temperature of the powder remains low. For instance, frozen carbon dioxide (dry ice) can be placed in tank 6 or a coolant fluid such as cooled nitrogen gas, carbon dioxide gas, or water can be applied to the outer surface of each unit through coils (not shown) around the units.

What is claimed is:

1. A first food product coated with a hardened fat in powder form in an amount sufficient to prevent adherence of the product to another during freezing or refrigeration in contact with a second food product coated with a hardened fat in powder form in an amount at least sufficient to prevent adherence of the second food product to the first food product, whereby the first and second food products are coated on their mutually contacting surfaces with said hardened fat and wherein the first and second food products are selected from the group consisting of meat, seafood, and poultry.

2. The products of claim 1 wherein said food products are bacon slices.

3. The products of claim 1 wherein said food products are pork patties.

4. The products of claim 1 wherein said fat is hardened lard.

5. The products of claim 1 wherein said hardened fat has a Wiley melting point between about 110° to about 175° F, an iodine value of from about 0 to about 10, free fatty acid value of about 0.5% maximum, and remains in powder form at temperatures at least below about 95° F.

6. The products of claim 1 wherein 100% of the fat will pass through a U.S. No. 30 sieve at 10° F.

7. The products of claim 1 wherein said food products are bacon slices, and said fat is hardened lard having a Wiley melting point between about 110° to about 175° F, an iodine value of from about 0 to 10, free fatty acid value of about 0.5% maximum, remains in powder form at temperatures at least below about 95° F, and has a particle size whereby at least about 75° of the powder will pass through a U.S. No. 200 mesh sieve at 70° F.

8. The products of claim 1 wherein said food products are bacon slices and wherein said bacon slices are packaged one on top of the other without any nonfood barrier between the slices.

9. The products of claim 1 wherein said food products are bacon slices and wherein the amount of powder is effective to prevent adherence during freezing of the bacon slices.

10. The products of claim 1 wherein said food products are fish.

11. The products of claim 1 wherein said food products are meat.

12. The products of claim 1 wherein said products are poultry.

13. The products of claim 1 wherein said food products are hamburger patties.

14. The products of claim 13 wherein both sides of each food product is coated.

15. The products of claim 1 wherein said food products are breaded fish.

* * * * *